(12) United States Patent
Li et al.

(10) Patent No.: US 10,606,939 B2
(45) Date of Patent: *Mar. 31, 2020

(54) APPLYING MATCHING DATA TRANSFORMATION INFORMATION BASED ON A USER'S EDITING OF DATA WITHIN A DOCUMENT

(71) Applicant: International Business Machines Corporation, Armonk, NY (US)

(72) Inventors: Yong Li, Newton, MA (US); Ryan Pham, San Jose, CA (US); Xiaoyan Pu, Chelmsford, MA (US); Yeh-Heng Sheng, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/176,181

(22) Filed: Oct. 31, 2018

(65) Prior Publication Data

US 2019/0258705 A1 Aug. 22, 2019

Related U.S. Application Data

(63) Continuation of application No. 15/898,819, filed on Feb. 19, 2018, now Pat. No. 10,387,554.

(51) Int. Cl.
*G06F 17/00* (2019.01)
*G06F 17/24* (2006.01)
(Continued)

(52) U.S. Cl.
CPC ............ *G06F 17/24* (2013.01); *G06F 16/252* (2019.01); *G06F 16/254* (2019.01); *G06F 17/211* (2013.01); *G06F 16/1794* (2019.01)

(58) Field of Classification Search
CPC ...... G06F 17/24; G06F 17/211; G06F 16/252; G06F 16/254
(Continued)

(56) References Cited

U.S. PATENT DOCUMENTS

| 5,216,604 A | 6/1993 | Sakata et al. |
| 5,940,573 A | 8/1999 | Beckwith |

(Continued)

FOREIGN PATENT DOCUMENTS

WO WO2016193818 A1 12/2016

OTHER PUBLICATIONS

Aumueller, David et al., "Schema and Ontology Matching with COMA++", ACM 2005, Year 2005, pp. 906-908.
(Continued)

*Primary Examiner* — Cong-Lac Huynh
(74) *Attorney, Agent, or Firm* — Francis Lammes; Stephen J. Walder, Jr.; Robert C. Bunker

(57) ABSTRACT

A mechanism is provided for applying matching data transformation information based on a user's editing of data within a document. User input identifying inputs provided by a user while editing a document within an application executing on the data processing system is received. A matching algorithm is executed based on user input to identify one or more candidate transformation operations within a transformation operation data structure that matches the user input. Responsive to failing to identify any candidate transformation operations, an indication is provided that no candidate transformation operations are identifiable. Responsive to one or more candidate transformation operations being identified, a list of transformation operations is provided that includes the one or more candidate transformation operations to the user via the data processing system.

20 Claims, 7 Drawing Sheets

(51) Int. Cl.
*G06F 17/21* (2006.01)
*G06F 16/25* (2019.01)
*G06F 16/178* (2019.01)

(58) Field of Classification Search
USPC .................................................. 715/200, 255
See application file for complete search history.

(56) References Cited

U.S. PATENT DOCUMENTS

| | | | |
|---|---|---|---|
| 6,745,176 | B2 | 6/2004 | Probert, Jr. et al. |
| 7,139,779 | B1 | 11/2006 | Kornelson et al. |
| 7,496,539 | B1 | 2/2009 | Bai et al. |
| 7,542,159 | B2 | 6/2009 | Yamada |
| 7,596,573 | B2 | 9/2009 | O'Neil et al. |
| 7,992,088 | B2 * | 8/2011 | Rose ................ G06F 17/218 715/234 |
| 9,020,882 | B2 | 4/2015 | Williamson |
| 9,268,801 | B2 | 2/2016 | Mazoue |
| 9,355,156 | B2 | 5/2016 | Roshen |
| 9,471,652 | B1 | 10/2016 | Bangs et al. |
| 2003/0167445 | A1 * | 9/2003 | Su ..................... G06F 16/88 715/239 |
| 2004/0044966 | A1 | 3/2004 | Malone |
| 2004/0249644 | A1 | 12/2004 | Schiefer et al. |
| 2008/0134025 | A1 | 6/2008 | Harada |
| 2008/0172607 | A1 | 7/2008 | Baer |
| 2008/0195378 | A1 * | 8/2008 | Nakazawa ........ G06F 16/3329 704/9 |
| 2008/0263443 | A1 * | 10/2008 | Maxime ............ G06F 17/2755 715/271 |
| 2009/0113292 | A1 | 4/2009 | Voss et al. |
| 2011/0252310 | A1 * | 10/2011 | Rahaman ........... G06F 17/2211 715/255 |
| 2013/0205203 | A1 | 8/2013 | MacDougall et al. |
| 2014/0082635 | A1 | 3/2014 | Sitrick et al. |
| 2014/0115446 | A1 | 4/2014 | Hall et al. |
| 2014/0149857 | A1 | 5/2014 | Vagell et al. |
| 2015/0248592 | A1 | 9/2015 | Wang et al. |
| 2016/0103812 | A1 | 4/2016 | Badger et al. |
| 2016/0196358 | A1 | 7/2016 | Bell et al. |
| 2016/0350201 | A1 | 12/2016 | Greene et al. |
| 2016/0358505 | A1 | 12/2016 | Isted et al. |
| 2017/0004210 | A1 | 1/2017 | Agarwal et al. |
| 2018/0077207 | A1 * | 3/2018 | Inoue ................ H04L 61/1535 |
| 2019/0228003 | A1 * | 7/2019 | Goldman ............ G06F 3/0484 |
| 2019/0236460 | A1 * | 8/2019 | Jagota ................ G06N 20/00 |

OTHER PUBLICATIONS

Cheng, Ming-Ming et al., "RepFinder: Finding Approximately Repeated Scene Elements for Image Editing", ACM 2010, Year 2010, pp. 83.1-83.8.

List of IBM Patents or Patent Applications Treated as Related, Oct. 4, 2018, 2 pages.

Carnell, Andrew et al., "Information Management Platform for Data Analytics and Aggregation (IMPALA) System Design Document", National Aeronautics and Space Administration, Report No. HHPC 10061, Aug. 1, 2016, 71 pages.

Seyb, Allyson et al., "Innovative Production Systems at Statistics New Zealand: Overcoming the Design and Build Bottleneck", Statistics Sweden, Journal of Official Statistics, vol. 29, No. 1, Mar. 1, 2013, pp. 73-97.

* cited by examiner

APPLYING MATCHING DATA TRANSFORMATION INFORMATION BASED ON A USER'S EDITING OF DATA WITHIN A DOCUMENT

BACKGROUND

The present application relates generally to an improved data processing apparatus and method and more specifically to mechanisms for applying matching data transformation information based on a user's editing of data within a document.

Traditional extract, transform, and load (ETL) tools are flow oriented, such that developers first create data flow jobs based on business logic, run those jobs to generated processed data, and then write the processed data to a target. Cloud data preparation services are data oriented, where data engineers first load data to a shaper, directly apply transformation operations to the data, and then save the shaped data to a target. Although the concept around data integration is different, the challenge on how to improve developer/engineer productivity is similar. With traditional ETL tools, developers are facing the challenge on how to come up with an optimal design, where in cloud services, engineers are facing the challenge on how to navigate through hundreds of available operations to effectively find a correct operation needed for data preparation requirements. For instance, if a data engineer has to pick an operation from a long list of 500 items, no matter how the list is organized, it is always difficult and time consuming for the data engineer to find the right operation.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for applying matching data transformation information based on a user's editing of data within a document. The illustrative embodiment receives user input identifying inputs provided by a user while editing a document within an application executing on the data processing system. The illustrative embodiment executes a matching algorithm based on user input to identify one or more candidate transformation operations within a transformation operation data structure that matches the user input. The illustrative embodiment provides an indication that no candidate transformation operations are identifiable in response to failing to identify any candidate transformation operations. The illustrative embodiment provides a list of transformation operations that includes the one or more candidate transformation operations to the user via the data processing system in response to one or more candidate transformation operations being identified.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
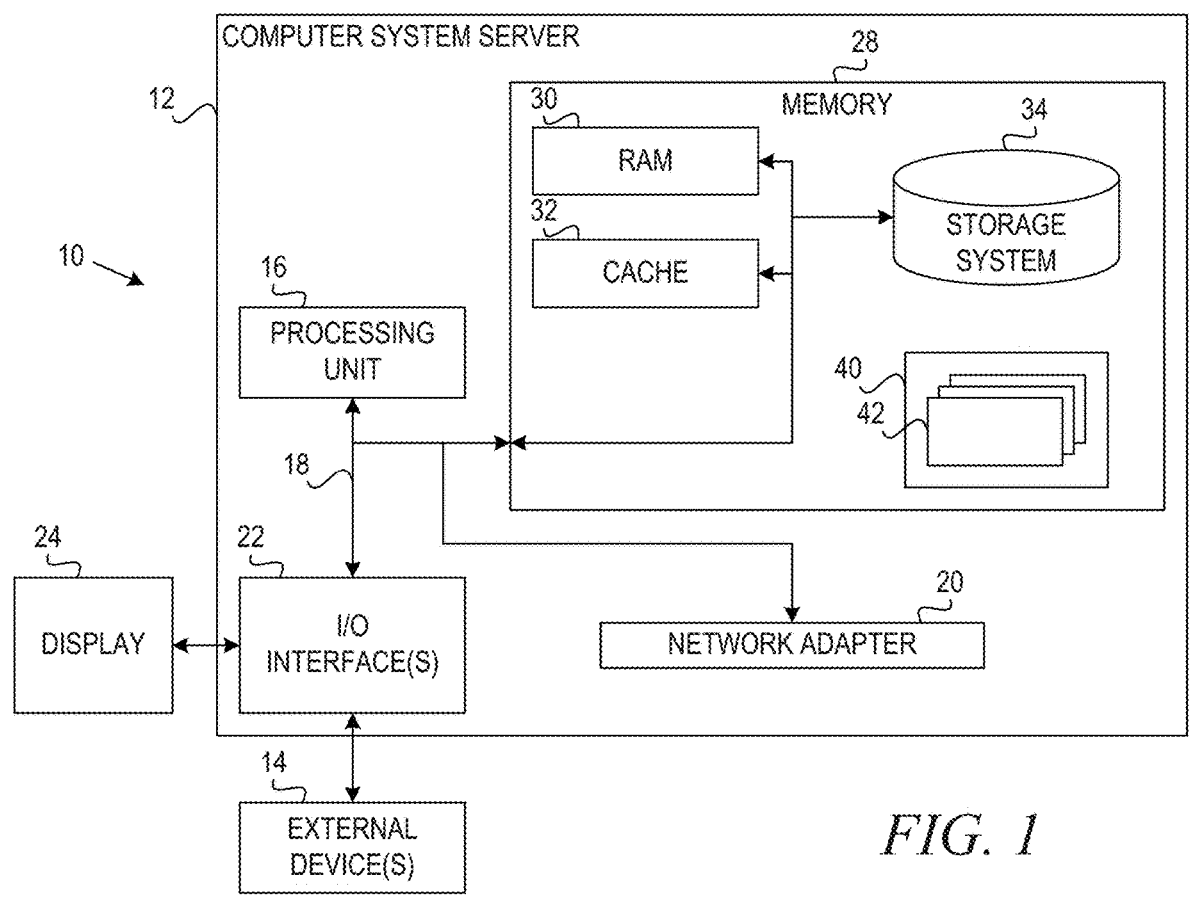
FIG. 1 depicts a cloud computing node according to an embodiment of the present invention.

The illustrative embodiments provide mechanisms for applying matching data transformation information based on a user's editing of data within a document. As noted, with traditional extract, transform, and load (ETL) tools, navigating through hundreds of available operations to effectively identify a correct operation for data preparation requirements may be difficult and time consuming for a user, regardless of the user is a developer, a data engineer, or simply an everyday user. To solve this issue, one solution is to use a tree structure to organize operation category putting different operation groups into different categories, such as a category for math function, a category for string functions, a category for date functions, a category for financial functions, or the like. Another solution is to provide a filter or function search capability that narrows down the list of operations. For example, if "f" or "F" is entered, a short list of possible operations that contain the string "f" or "F" will be displayed, such as:

Filter
Find
Get File Name
Get First Name

While such solutions may make an application more usable, these solutions require the user to understand the exact context and enter the right search criteria to be able to use the capability.

Thus, the illustrative embodiments provide a matching data transformation mechanism that records a user's editing of data within a document, analyzes data transformations performed during the editing in view of the data that is being edited, identifies one or more data transformation operations that matches the data transformations performed by the user, and provides a list of the one or more transformation operations for the user's use in order to improves further editing performed by the user thereby reducing the time required by the user in editing the data of the document. In accordance with the illustrative embodiments, a document may include, but is not limited to, a text document, an spreadsheet, a presentation, or the like and a data transformation may include, but is not limited to, removing duplicate entries, changing data types, removing white space, deleting trailing spaces, or the like.

Thus, rather than the user transforming the data using multiple different inputs, such as placing the cursor at a place in the document where there is identified trailing spaces and depressing the "Delete" or "Backspace" key multiple times to remove the trailing spaces, once the user performs such an operation once, the matching data transformation mechanism presents one or more transformation operation that may be used by the user to removing trailing spaces throughout the document. Responsive to the user selecting one of the identified one or more transformation operations, the matching data transformation mechanism performs the selected transformation operation to the entire document thereby improving usability and saving data preparation time. Users no longer have to perform such operation over and over again throughout the document or use trial and error or navigate through the long list of transformation operations to find the right one, avoid repetitive changes over and over again. Performing data transformation utilizing transformation operations also simplifies user interface representation because current operation menus bars or ribbons may be hidden thereby saving a large space from displaying hundreds of transformation operations. Performing data transformation utilizing transformation operations further reduces interactive response time because transformation operation may be applied as soon as the user completes a first data edit. Thus, if similar edits need to be applied to the remainder of the document, the user may simply indicate replication of the selected transformation operation and the matching data transformation mechanism performs the transformation operations to the remainder of the document. The matching data transformation mechanism thus gains intelligence from user input and automatically applies matched transformation operations to help improve user productivity.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
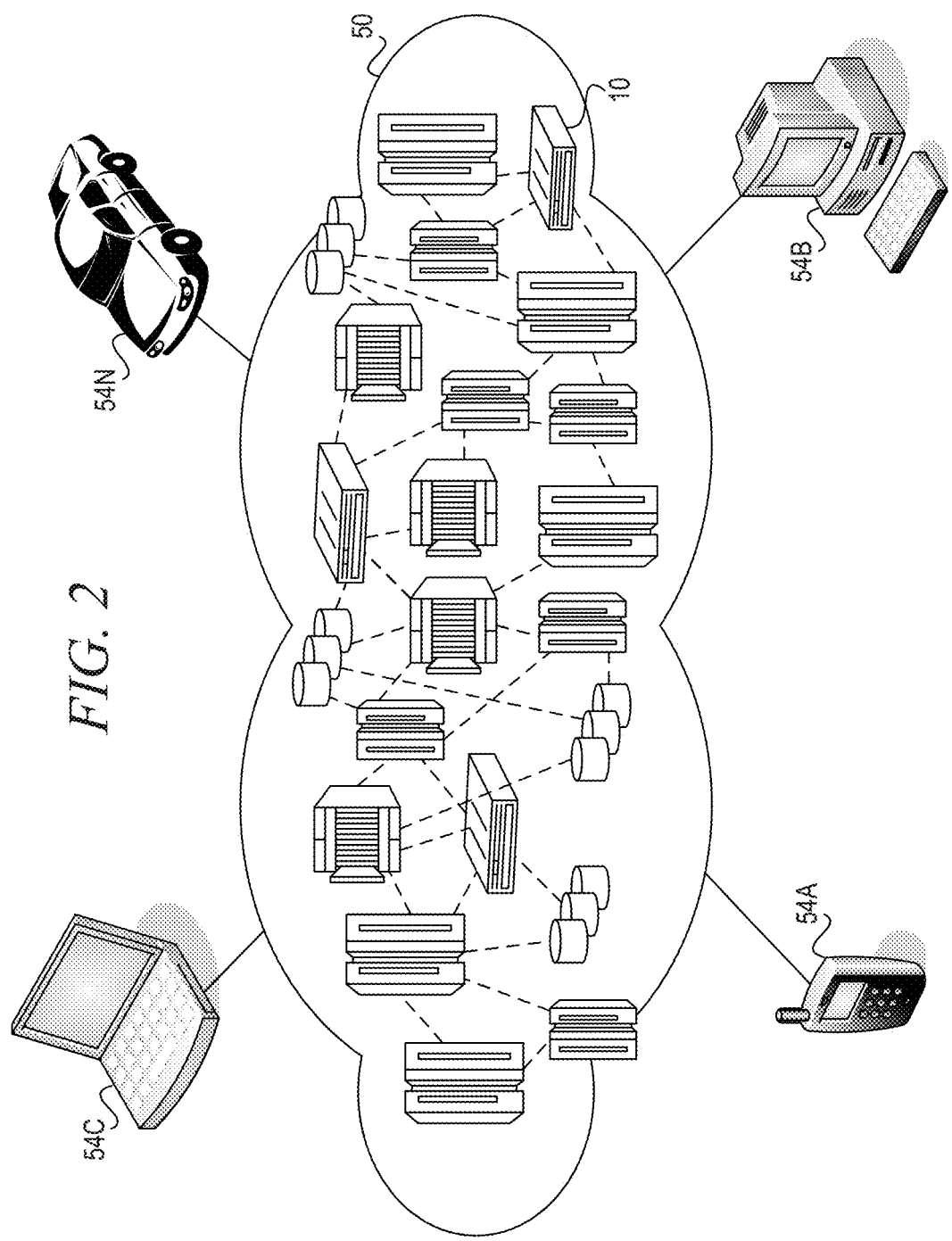
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
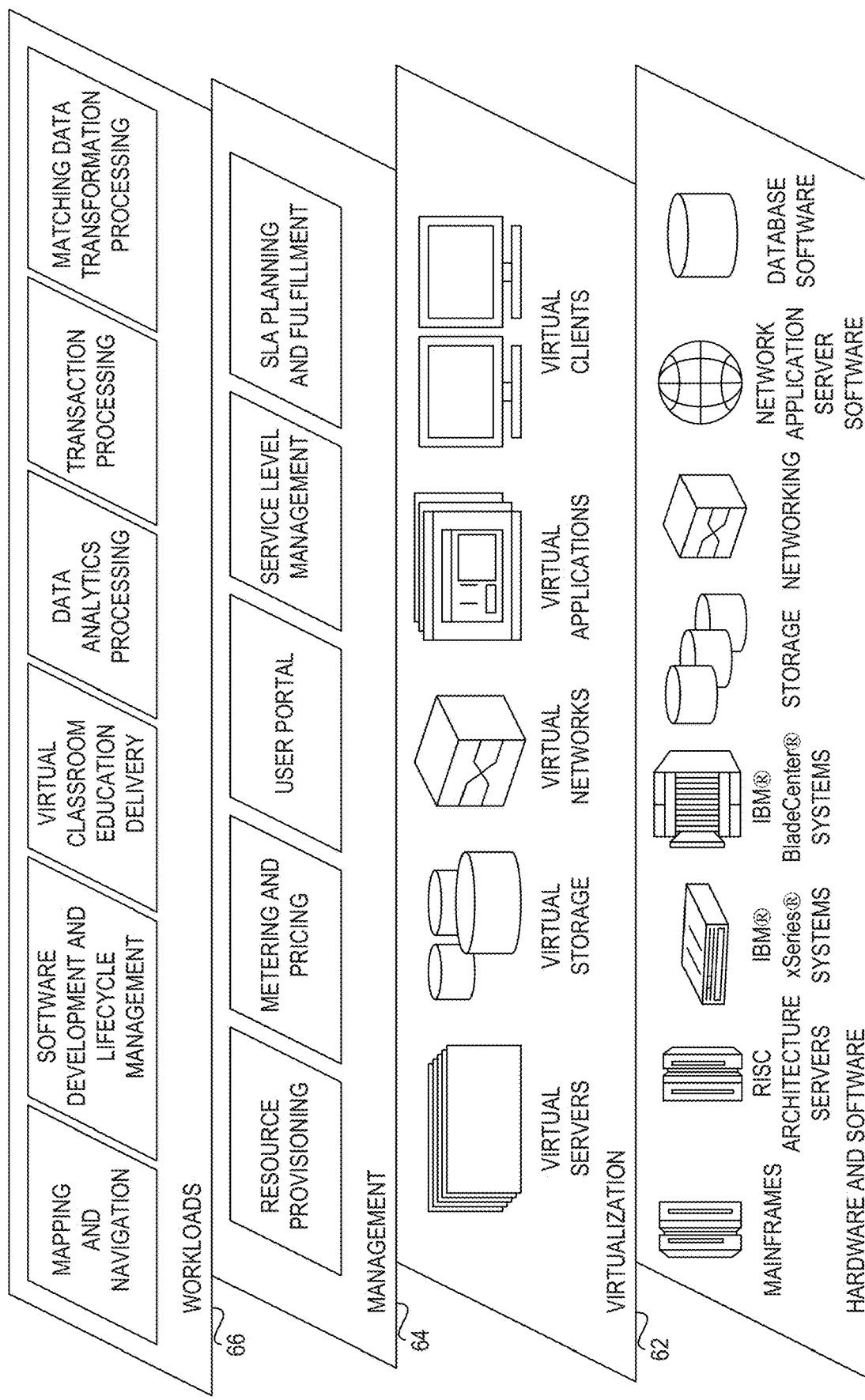
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and matching data transformation processing.

Figure 4:
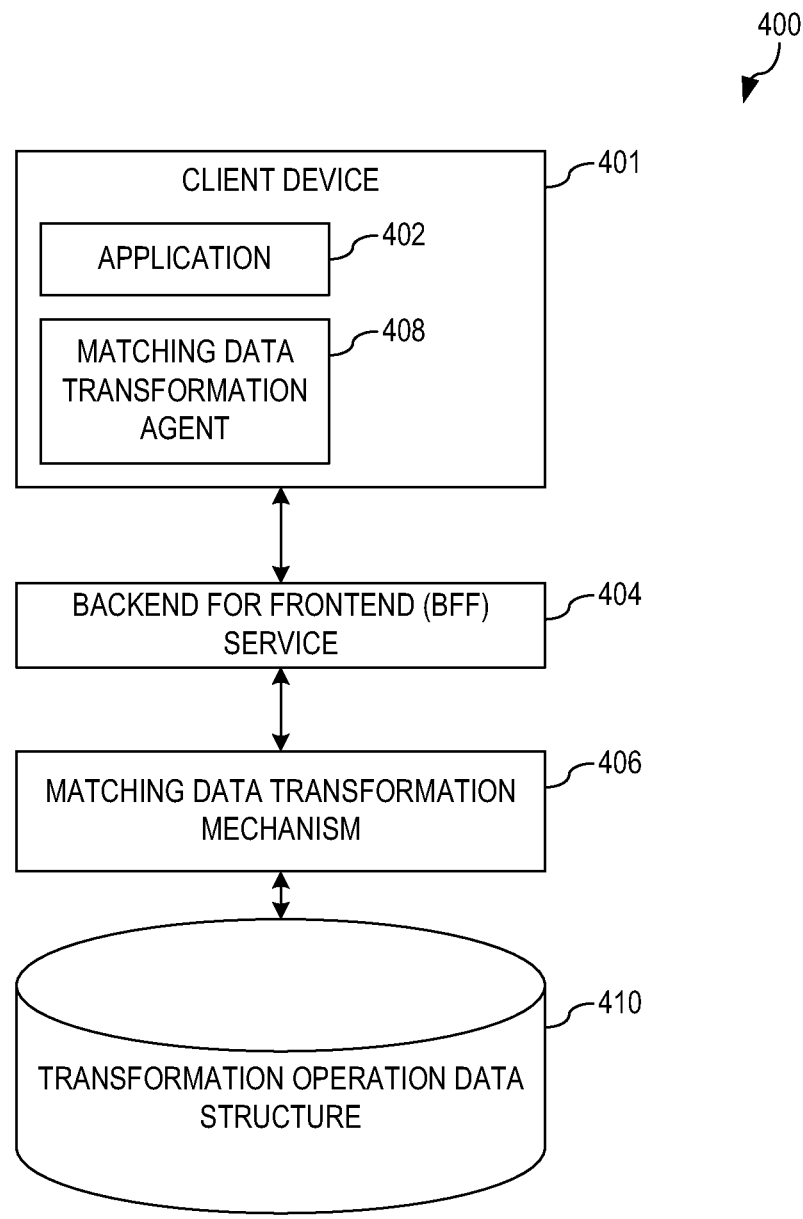
FIG. 4 depicts a functional block diagram of a matching data transformation mechanism that identifies matching data transformation information based on a user's editing of data within a document and, based on user indication, applies a selected matching data transformation operation to the remainder of the document in accordance with an illustrative embodiment.

FIG. 4 depicts a functional block diagram of a matching data transformation mechanism that identifies matching data transformation information based on a user's editing of data within a document and, based on user indication, applies a selected matching data transformation operation to the remainder of the document in accordance with an illustrative embodiment. Data processing system 400 comprises application 402 associated with client device 401, which is coupled to Backend For Frontends (BFF) service 404, which is coupled to matching data transformation mechanism 406. Application 402 may be an application utilized on a mobile phone, laptop, PDA or the like, or an application provided by a computing device, server, or the like. BFF service 404, which application 402 communicates with, is composed by several microservices which act as a facade for the different features provided by matching data transformation mechanism 406.

In operation, as the user edits a document within application 402 executing on client device 401, such as a text document, an spreadsheet, a presentation, or the like, matching data transformation agent 408 comprised within client device 401 collects user input, application metadata, or the like. Matching data transformation agent 408 transmits the collected user input, metadata, or the like, to BFF service 404 as it is collected, with BFF service 404 sending a request to matching data transformation mechanism 406 to match one or more transformation operations to the collected input, metadata, or the like. Matching data transformation mechanism 406 executes a matching algorithm based on user input to identify one or more transformation operations within transformation operation data structure 410.

Transformation operations within transformation operation data structure 410 are categorized in terms of data types, for example:
  String data type, such as string manipulation functions, date/time/timestamp from string, or the like;
  Numeric data type, such as math functions, date/time/timestamp from number, or the like; or
  Date/time/timestamp data type, such as string from date/time/timestamp, number from date/time/timestamp, or the like.

The matching algorithm performed by matching data transformation mechanism 406 may be illustrated by, for example:
1. Comparing a value of a previous data in the collected user input to a value of new data in the collected user input, i.e. the data edited by the user. If the value of the data did not change, compare a format of the previous data to a format of the new data. If the format changed, return a transformation operation associated with the format conversion performed. For example, string format to number format, or number format to string format.
2. If the format did not change, identify one or more operations performed by the user in the collected user input.
3. Iterate through step 2, taking another previous data in the collected user input, execute the transformation operation in transformation operation data structure 410 one-by-one on the other previous data to get a new data, and check whether the new data matches the new data in the collected user input.
4. If the result of applying the transformation operation on the other previous data matches the new data in the collected user input, then that transformation operation is a candidate. If the result of applying the transformation operation on the other previous data fails to match the new data in the collected user input, then that transformation operation is not a candidate.
5. Repeat steps 3 and 4 until the entire operation category identified at step 2 has been analyzed.
6. Return the list of matched transformation operations to BFF service 404, which BFF service 404 then returns to matching data transformation agent 408.

Once matching data transformation agent 408 receives the list of transformation operations, matching data transformation agent 408 prompts the user with the list of transformation operations in the graphical user interface of client device 401. The user may then select a transformation operation from the list of transformation operation thereby indicating that the selected transformation operation is to be applied to the remainder of the entire document or portion of the document. That is, for example, in a text document, the selected transformation operation could be applied to all text within the document. However, for example, in a spreadsheet document, the selected transformation operation may be applied to a current column or row without applying the selected transformation operation to other columns or rows. Of, if indicated by the user, the selected transformation operation may be applied to multiple columns or rows or yet, the entire spreadsheet.

Thus, once a transformation operation is selected by the user, matching data transformation agent 408 automatically applies the selected transformation operation to all or a portion of the document. Matching data transformation agent 408 may provide an indication to the user of all the changes that were made by applying the selected transformation operation, such as through track changes, highlighting, or the like. If the user confirms application of the selected transformation operation, then matching data transformation agent 408 makes the change permanent. If the user indicated the changes should be undone, then matching data transformation agent 408 undoes all of the changes made by matching data transformation agent 408. The user may then select another transformation operation or cancel application of suggest transformation operations. If user selects a different transformation operation from the list of transformation operations, the process repeats as described previously. If the user indicates that the application of suggest transformation operations, matching data transformation agent 408 removes the list of transformation operation from the graphical user interface.

If matching data transformation mechanism 406 is unable to identify any candidate transformation operation based on the user input, metadata, or the like, matching data transformation mechanism 406 provides an indication of "no candidate transformation operations identified" to BFF service 404, which BFF service 404 then returns to matching data transformation agent 408. Response to receiving a "no candidate transformation operations identified" indication, matching data transformation agent 408 may play a sound to notify user that matching data transformation mechanism 406 was unable to understand what user is doing, thus, no transformation operations were recommended.

In order to exemplify the inventive aspects of the illustrative embodiment, consider the following exemplary scenario. In the scenario, a user edited the first value of "Product Name" column of a spreadsheet by deleting a trailing space and changing "x" to "X". Matching data transformation agent 408 sends the user input to BFF service 404, which sends the user input to matching data transformation mechanism 406, the user input being:

column name: Product Name
  column data type: string
  old value: xbox (with trailing space)
  new data value: Xbox (without trailing space)

Matching data transformation mechanism 406 first compares the old value with the new data value. The two values are not equal, so matching data transformation mechanism 406 determines what else changed. From the column metadata type, matching data transformation mechanism 406 identifies the string operation category to focus on. After iterations, matching data transformation mechanism 406 identifies operations relating to user input with regard to trimming trailing white spaces and capitalizing the first letter of each product name. Matching data transformation mechanism 406 then searches for transformation operations in transformation operation data structure 410 associated with trimming trailing white spaces and capitalizing the first letter of each product name. Matching data transformation mechanism 406 then generates a list of candidate transformation operations identified from transformation operation data structure 410 associated with trimming trailing white spaces and capitalizing the first letter of each product name. Matching data transformation mechanism 406 sends the list of candidate transformation operations to BFF service 404, which sends the list to matching data transformation agent 408. Matching data transformation agent 408 presents the list of candidate transformation operations to the user in the graphical user interface of client device 401. Responsive to the user selecting one or more of the transformation operation from the list of candidate transformation operations, matching data transformation agent 408 applies the transformation to all or a portion of the document as indicated by the user.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 5:
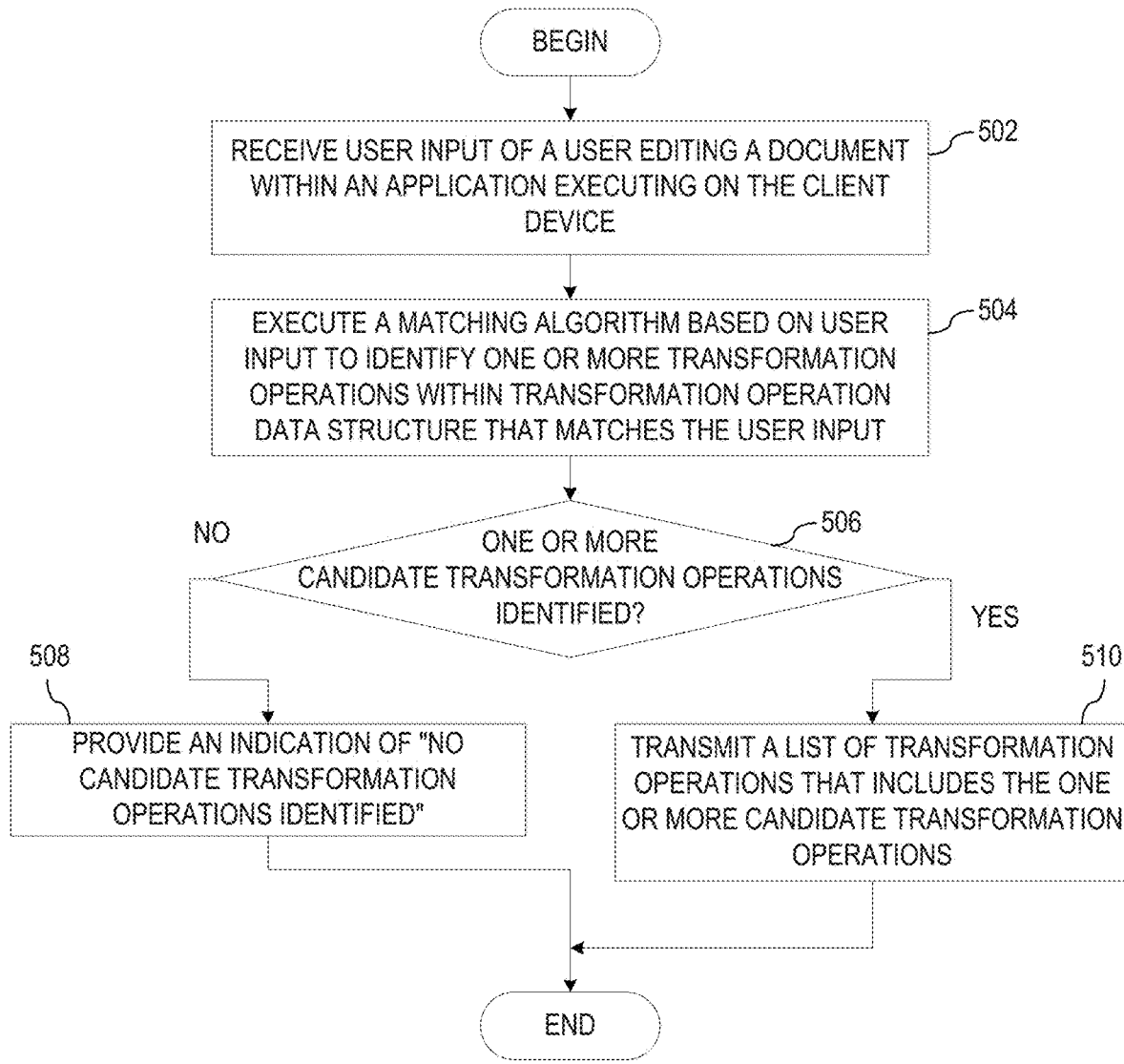
FIG. 5 depicts a flowchart of the operations performed in identifying one or more matching transformation operations based on a user's editing of data within a document in accordance with an illustrative embodiment.

FIG. 5 depicts a flowchart of the operations performed in identifying one or more matching transformation operations based on a user's editing of data within a document in accordance with an illustrative embodiment. As the operation begins, a matching data transformation mechanism receives user input from a matching data transformation agent that collects user input as a user edits a document within an application executing on the client device (step 502). The matching data transformation mechanism receives the collected user input from the matching data transformation agent via a BFF service. The matching data transformation mechanism then executes a matching algorithm based on user input to identify one or more transformation operations within a transformation operation data structure that matches the user input (step 504). The matching data transformation mechanism determines whether one or more candidate transformation operations have been identified (step 506).

If at step 506 no candidate transformation operations have been identified, the matching data transformation mechanism provides an indication of "no candidate transformation operations identified" to the matching data transformation agent via the BFF service (step 508), which causes the matching data transformation agent to notify the user that no transformation operations are recommended. The operation terminates thereafter. If at step 506 one or more candidate transformation operations are identified, the matching data transformation mechanism transmits a list of transformation operations that includes the one or more candidate transformation operations to the matching data transformation agent via the BFF service (step 510), which causes the matching data transformation agent to present the list of transformation operations to the user. The operation terminates thereafter.

Figure 6:
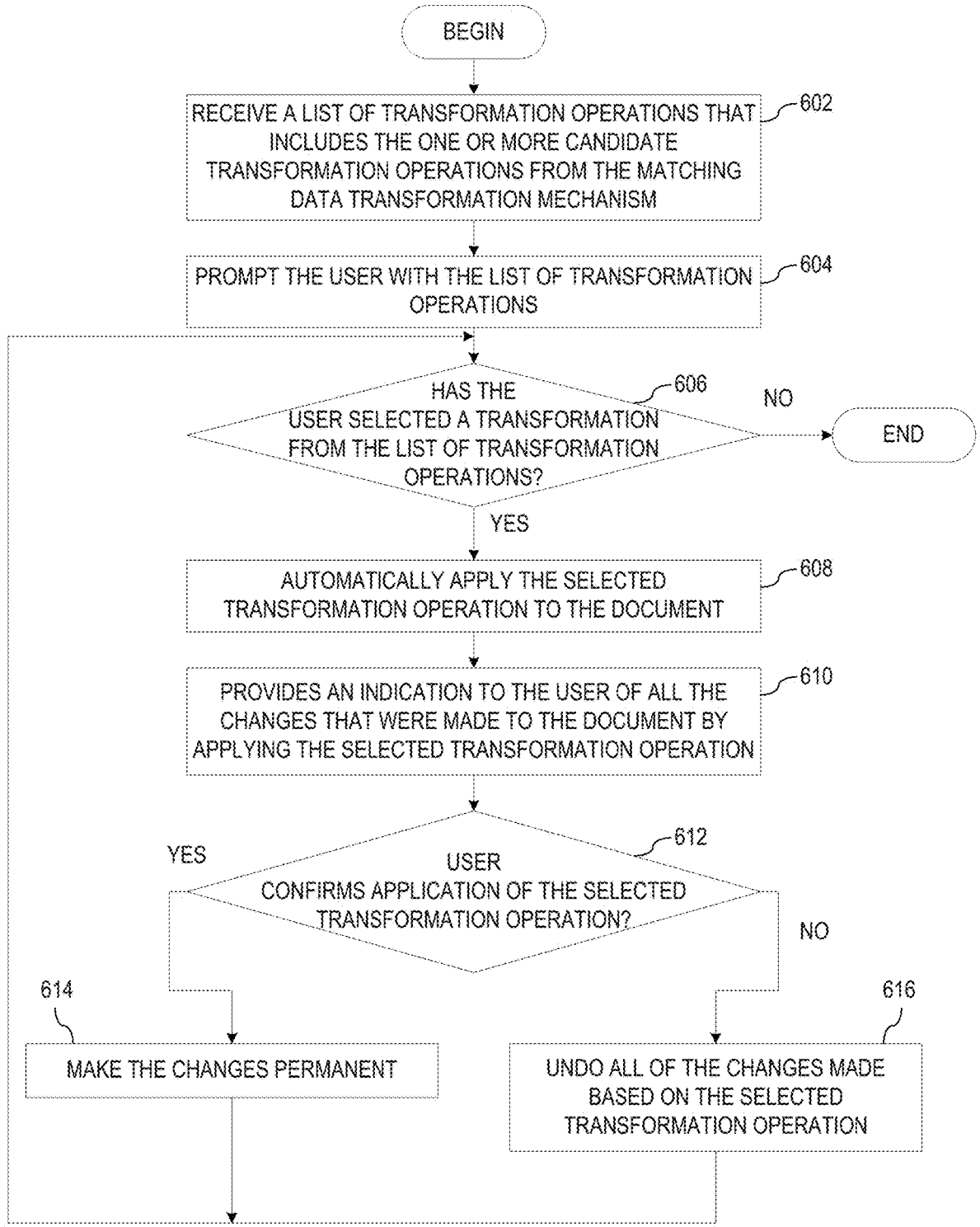
FIG. 6 depicts a flowchart of the operations performed in applying the one or more matching transformation operations within a document in accordance with an illustrative embodiment.

FIG. 6 depicts a flowchart of the operations performed in applying the one or more matching transformation operations within a document in accordance with an illustrative embodiment. As the operation begins, the matching data transformation agent receives a list of transformation operations that includes the one or more candidate transformation operations from the matching data transformation mechanism via the BFF service (step 602). The matching data transformation agent prompts the user with the list of transformation operations in the graphical user interface of the client device (step 604). The matching data transformation agent then determines whether the user has selected a transformation from the list of transformation operations thereby indicating that the selected transformation operation is to be applied to the document (step 606). If at step 606 the matching data transformation agent receives an indication from the user, then matching data transformation agent automatically applies the selected transformation operation to the document (step 608). The matching data transformation agent then provides an indication to the user of all the changes that were made to the document by applying the selected transformation operation (step 610). The matching data transformation agent determines whether the user confirms application of the selected transformation operation (step 612).

If at step 612 the user confirms application of the selected transformation operation, the matching data transformation agent makes the changes permanent (step 614). If at step 612 the user indicates the changes should be undone, then matching data transformation agent undoes all of the changes made based on the selected transformation operation (step 616). From step 614 or 616, the operation returns to step 606. If at step 606 the user provides an indication that none of the transformation operations in the list of transformation operation should be applied, then the operation terminates.

Figure 7:
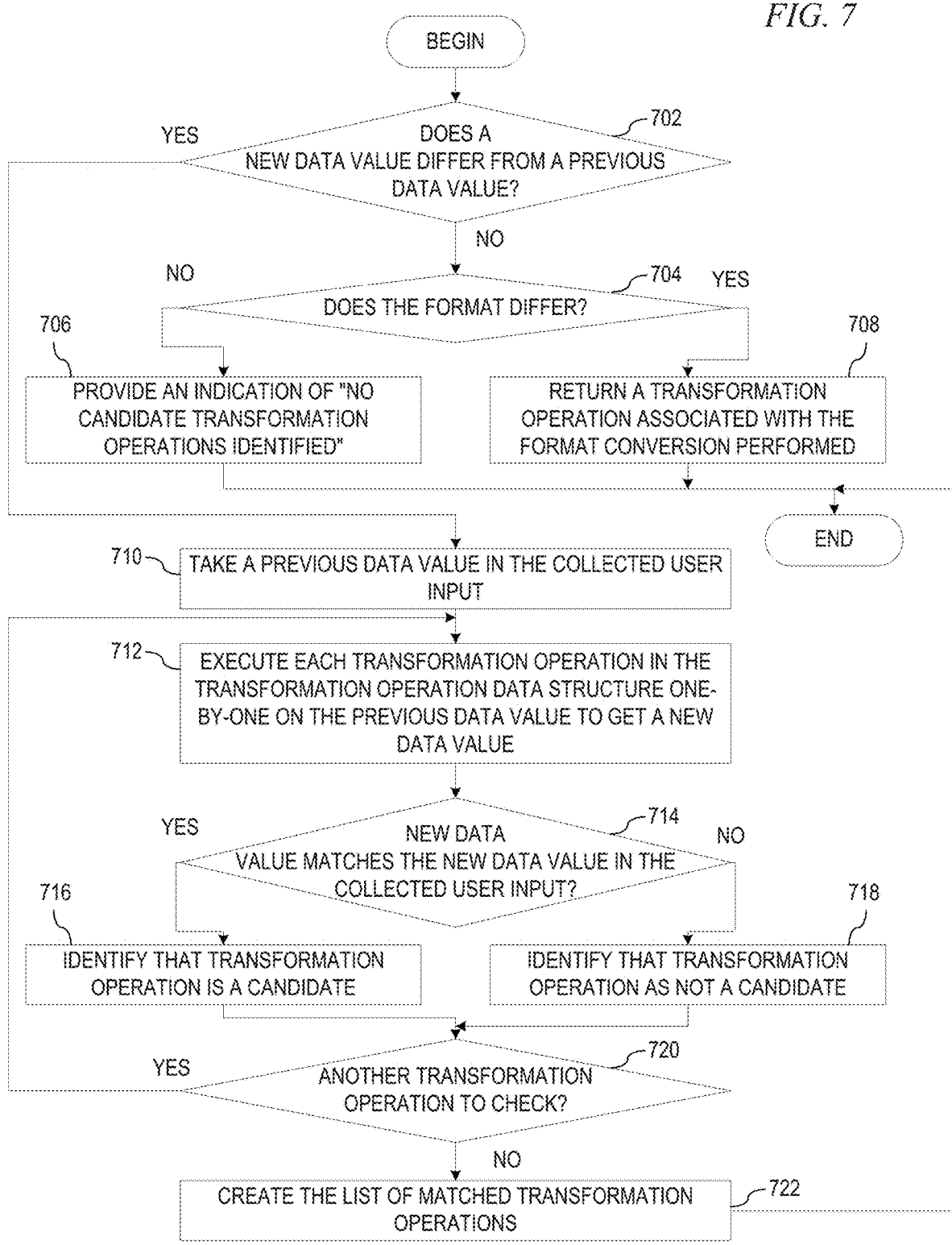
FIG. 7 depicts a flowchart of the operations performed in executing the matching algorithm based on user input to identify one or more transformation operations within a transformation operation data structure that matches the user input in accordance with an illustrative embodiment.

FIG. 7 depicts a flowchart of the operations performed in executing the matching algorithm based on user input to identify one or more transformation operations within a transformation operation data structure that matches the user input in accordance with an illustrative embodiment. As the operation begins, the matching data transformation mechanism compares a previous data value changed by the user to a new data value (step 702). If at step 702 the value of the data did not change, the matching data transformation mechanism compares a format of the previous data value to a format of the new data value (step 704). If at step 704 the format did not change, the matching data transformation mechanism provides an indication of "no candidate transformation operations identified" (step 706), with the operation terminating thereafter. If at step 704 the format did change, then the matching data transformation mechanism returns a transformation operation associated with the format conversion performed (step 708), with the operation terminating thereafter.

If at step 702 the value of the data did change, the matching data transformation mechanism takes a previous data value in the collected user input (step 710), executes each transformation operation in the transformation operation data structure one-by-one on the previous data value to get a new data value (step 712), and checks whether the new data value matches the new data value in the collected user input (step 714). If at step 714 the result of applying the transformation operation on the previous data value matches the new data value in the collected user input, the matching data transformation mechanism identifies that transformation operation is a candidate (step 716). If at step 714 the result of applying the transformation operation on the previous data value fails to match the new data value in the collected user input, the matching data transformation mechanism identifies that transformation operation as not a candidate (step 718). From steps 716 and 718, the matching data transformation mechanism determines whether there is another transformation operation in the transformation operation data structure to check (step 720). If at step 720 there is another transformation operation in the transformation operation data structure to check, the operation returns to step 712. If at step 720 there is no other transformation operation in the transformation operation data structure to check, the matching data transformation mechanism creates the list of matched transformation operations (step 722), with the operation terminating thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for applying matching data transformation information based on a user's editing of data within a document. The matching data transformation mechanism records a user's editing of data within a document, analyzes data transformations performed during the editing in view of the data that is being edited, identifies one or more data transformation operations that matches the data transformations performed by the user, and provides a list of the one or more transformation operations for the user's use in order to improves further editing performed by the user thereby reducing the time required by the user in editing the data of the document. Responsive to the user selecting one of the identified one or more transformation operations, the matching data transformation mechanism performs the selected transformation operation to the entire document thereby improving usability and saving data preparation time. Users no longer have to perform such operation over and over again throughout the document or use trial and error or navigate through the long list of transformation operations to find the right one, avoid repetitive changes over and over again. Performing data transformation utilizing transformation operations also simplifies user interface representation because current operation menus bars or ribbons may be hidden thereby saving a large space from displaying hundreds of transformation operations. Performing data transformation utilizing transformation operations further reduces interactive response time because transformation operation may be applied as soon as the user completes a first data edit. Thus, if similar edits need to be applied to the remainder of the document, the user may simply indicate replication of the selected transformation operation and the matching data transformation mechanism performs the transformation operations to the remainder of the document. The matching data transformation mechanism thus gains intelligence from user input and automatically applies matched transformation operations to help improve user productivity.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for applying matching data transformation information based on a user's editing of data within a document, the method comprising:
   receiving user input identifying an edit to the data provided by a user while editing the data of the document within an application executing on the data processing system;
   executing a matching algorithm based on the edit to the data to identify one or more candidate transformation operations within a transformation operation data structure that matches the edit to the data;
   receiving a selection of a transformation operation from the list of transformation operations by the user;
   automatically applying the selected transformation operation to the document; and
   providing an indication to the user of all the changes that were made to the document by applying the selected transformation operation.

2. The method of claim 1, further comprising:
responsive to the user indicating that the changes should be made permanent, making the changes permanent.

3. The method of claim 1, further comprising:
responsive to the user indicating that the changes should not be made permanent, undoing the changes made based on the selected transformation operation.

4. The method of claim 1, wherein the transformation operations within the transformation operation data structure are categorized in terms of data types, wherein the data types comprise one or more of a string data type, a numeric data type, or a date/time/timestamp data type.

5. The method of claim 1, wherein executing the matching algorithm based on the edit to the data to identify the one or more candidate transformation operations within the transformation operation data structure that matches the edit to the data comprises:
comparing a value of a previous data in collected user input to a value of the data in the edit to the data;
responsive to no change in the value of the data, comparing a format of the previous data to a format of the data in the edit to the data; and
responsive to the format of the data changing, returning a transformation operation associated with format conversion.

6. The method of claim 1, further comprising:
responsive to the format of the data failing to change, providing the indication that no candidate transformation operations are identifiable.

7. The method of claim 1, wherein executing the matching algorithm based on the edit to the data to identify the one or more candidate transformation operations within the transformation operation data structure that matches the edit to the data comprises:
for each transformation operation in the transformation operation data structure:
executing the transformation operation on a previous data value to get a new data value;
determining whether the new data value matches the edit to the data;
responsive to a result of applying the transformation operation on the previous data value matching the edit to the data, identifying the transformation operation as a candidate transformation operation and adding the candidate transformation to the list of transformation operations; and
responsive to the result of applying the transformation operation on the previous data value failing to match the edit to the data, discarding the transformation operation as a possible candidate transformation operation.

8. A computer program product comprising a computer readable storage medium having a computer readable program stored therein, wherein the computer readable program, when executed on a computing device, causes the computing device to:
receive user input identifying an edit to the data provided by a user while editing the data of the document within an application executing on the data processing system;
execute a matching algorithm based on the edit to the data to identify one or more candidate transformation operations within a transformation operation data structure that matches the edit to the data;
responsive to one or more candidate transformation operations being identified, provide a list of transformation operations that includes the one or more candidate transformation operations to the user via the data processing system;
receive a selection of a transformation operation from the list of transformation operations by the user;
automatically apply the selected transformation operation to the document; and
provide an indication to the user of all the changes that were made to the document by applying the selected transformation operation.

9. The computer program product of claim 8, wherein the computer readable program further causes the computing device to:
responsive to the user indicating that the changes should be made permanent, make the changes permanent.

10. The computer program product of claim 8, wherein the computer readable program further causes the computing device to:
responsive to the user indicating that the changes should not be made permanent, undo the changes made based on the selected transformation operation.

11. The computer program product of claim 8, wherein the transformation operations within the transformation operation data structure are categorized in terms of data types, wherein the data types comprise one or more of a string data type, a numeric data type, or a date/time/timestamp data type.

12. The computer program product of claim 8, wherein the computer readable program to execute the matching algorithm based on the edit to the data to identify the one or more candidate transformation operations within the transformation operation data structure that matches the edit to the data causes the computing device to:
compare a value of a previous data in collected user input to a value of the data in the edit to the data;
responsive to no change in the value of the data, compare a format of the previous data to a format of the data in the edit to the data; and
responsive to the format of the data changing, return a transformation operation associated with format conversion.

13. The computer program product of claim 8, wherein the computer readable program further causes the computing device to:
responsive to the format of the data failing to change, provide the indication that no candidate transformation operations are identifiable.

14. The computer program product of claim 8, wherein the computer readable program to execute the matching algorithm based on the edit to the data to identify the one or more candidate transformation operations within the transformation operation data structure that matches the edit to the data causes the computing device to:
for each transformation operation in the transformation operation data structure:
execute the transformation operation on a previous data value to get a new data value;
determine whether the new data value matches the edit to the data;
responsive to a result of applying the transformation operation on the previous data value matching the edit to the data, identify the transformation operation as a candidate transformation operation and adding the candidate transformation to the list of transformation operations; and
responsive to the result of applying the transformation operation on the previous data value failing to match the edit to the data, discard the transformation operation as a possible candidate transformation operation.

15. An apparatus comprising:
a processor, and
a memory coupled to the processor, wherein the memory comprises instructions which, when executed by the processor, cause the processor to:
receive user input identifying an edit to the data provided by a user while editing the data of the document within an application executing on the data processing system;
execute a matching algorithm based on the edit to the data to identify one or more candidate transformation operations within a transformation operation data structure that matches the edit to the data;
responsive to one or more candidate transformation operations being identified, provide a list of transformation operations that includes the one or more candidate transformation operations to the user via the data processing system
receive a selection of a transformation operation from the list of transformation operations by the user;
automatically apply the selected transformation operation to the document; and
provide an indication to the user of all the changes that were made to the document by applying the selected transformation operation.

16. The apparatus of claim 15, wherein the instructions further cause the processor to:
responsive to the user indicating that the changes should be made permanent, make the changes permanent.

17. The apparatus of claim 15, wherein the instructions further cause the processor to:
responsive to the user indicating that the changes should not be made permanent, undo the changes made based on the selected transformation operation.

18. The apparatus of claim 15, wherein the instructions to execute the matching algorithm based on the edit to the data to identify the one or more candidate transformation operations within the transformation operation data structure that matches the edit to the data cause the processor to:
compare a value of a previous data in collected user input to a value of the data in the edit to the data;
responsive to no change in the value of the data, compare a format of the previous data to a format of the data in the edit to the data; and
responsive to the format of the data changing, return a transformation operation associated with format conversion.

19. The apparatus of claim 15, wherein the instructions further cause the processor to:
responsive to the format of the data failing to change, provide the indication that no candidate transformation operations are identifiable.

20. The apparatus of claim 15, wherein the instructions to execute the matching algorithm based on the edit to the data to identify the one or more candidate transformation operations within the transformation operation data structure that matches the edit to the data cause the processor to:
for each transformation operation in the transformation operation data structure:
execute the transformation operation on a previous data value to get a new data value;
determine whether the new data value matches the edit to the data;
responsive to a result of applying the transformation operation on the previous data value matching the edit to the data, identify the transformation operation as a candidate transformation operation and adding the candidate transformation to the list of transformation operations; and
responsive to the result of applying the transformation operation on the previous data value failing to match the edit to the data, discard the transformation operation as a possible candidate transformation operation.

* * * * *